Jan. 31, 1956   B. BRIXNER   2,732,777
ULTRA HIGH SPEED LIGHT SHUTTER
Filed Jan. 7, 1953

WITNESSES:

INVENTOR:
Berlyn Brixner

United States Patent Office 2,732,777
Patented Jan. 31, 1956

2,732,777

ULTRA HIGH SPEED LIGHT SHUTTER

Berlyn Brixner, Los Alamos, N. Mex., assignor to the United States of America as represented by the United States Atomic Energy Commission Application January 7, 1953, Serial No. 330,132

3 Claims. (Cl. 95—53)

The present invention relates to high speed light shutters and, more particularly, to an explosively actuated high speed shutter which is particularly adaptable for use with high speed cameras.

In the art of high speed photography, cameras have been developed which require an extremely rapid method of light shuttering. One example of such a camera is the framing camera capable of a framing rate in excess of 3,000,000 frames per second, which is the subject of U. S. patent application by Berlyn Brixner for Continuous Recording High Speed Frame Camera, S. N. 330,131, filed January 7, 1953, now Patent No. 2,668,473.

In the use of high speed cameras employing rotating film drums or rotating mirrors, the light source must be eliminated precisely at the proper time to prevent double exposure of the film record. In order to utilize the greater portion of the short exposure time involved in such photography, it is necessary that the light shutter must effect complete closure in a minimum of time after the closure operation has begun. For example, if a light shutter having a closing time of ten microseconds (i. e., a time lapse of 10 microseconds between the time the shutter is actuated and begins to close and the time of complete light elimination) is used in combination with a camera having a writing time of fifty microseconds, the closure operation of the shutter need not be commenced until forty microseconds have elapsed. Thus, 40 microseconds of unobstructed exposure may be had and light will still be completely eliminated at the end of 50 microseconds, at which time double exposure would otherwise occur. A light shutter having a closure time of less than 10 microseconds is a necessity in order to attain improved operation in the high speed camera art.

It is an object of the present invention to provide a high speed light shutter, particularly adaptable for use with high speed cameras, which has a closure time of approximately 3 microseconds. This is accomplished by utilizing the shock wave from a small explosive detonator to internally shatter an optically clear, frangible glass block, thereby rendering it opaque.

Another object of the present invention is to provide an explosively actuated shutter which may be used in confined spaces and with no danger to operating personnel.

Figure 1:
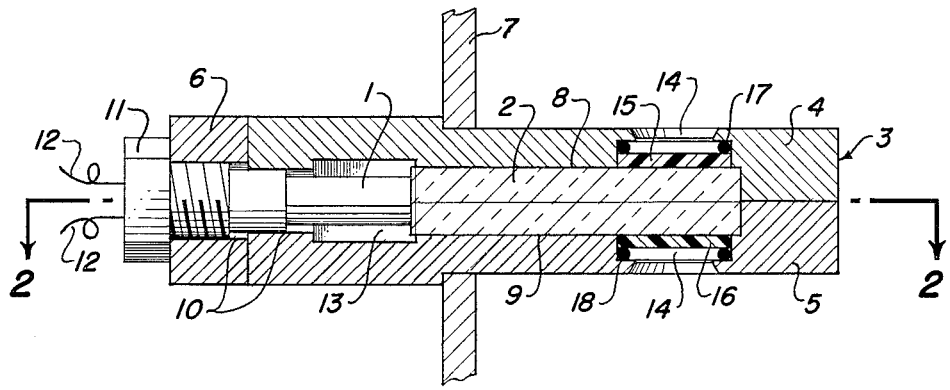
Figure 2:
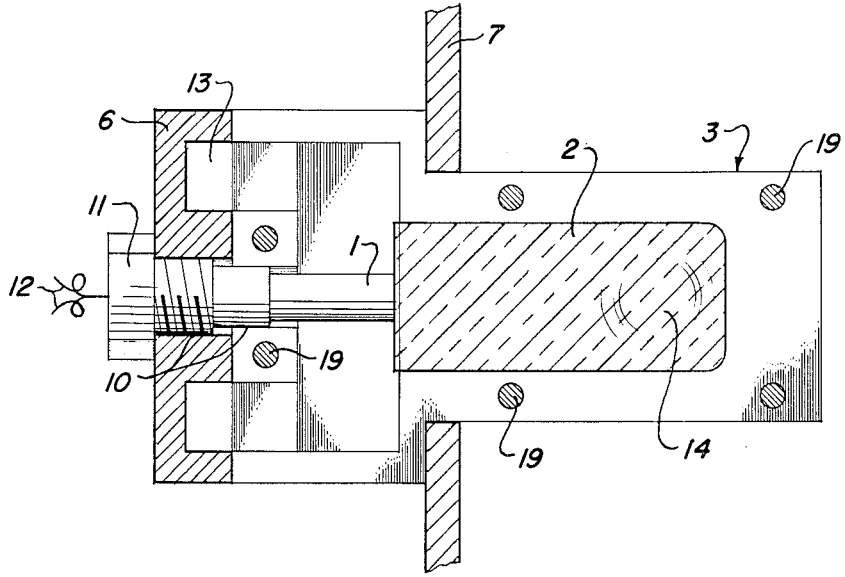

Other objects and advantages of the present invention will be apparent to those skilled in the art from the following specification of a preferred embodiment as illustrated in the accompanying drawings, made a part of the specification, in which:

Figure 1 is a sectional view in elevation of one embodiment of the shutter disclosed herein, and Figure 2 is a sectional plan view of the shutter taken on line 2—2 of Figure 1.

The present invention is a high speed shutter comprising a shutter housing having a light aperture therethrough and containing an optically clear, frangible glass block in the light path of the aperture, an explosive detonator within the housing in contact with the glass block, and means for detonating the explosive whereby the shock wave travels through the glass to render it opaque and effectively close the light path through the shutter.

Referring to the drawings, similar reference numerals refer to like parts throughout the two views. The shutter described herein comprises a small explosive detonator 1, an optically clear, frangible glass block 2, and a metallic housing 3 comprising two similar sections of opposite hand 4, 5 and a cap section 6.

The outer configuration of the housing 3 may be varied according to the application of the shutter, but in the preferred embodiment as shown and described the assembled housing has the configuration of two rectangles of different widths. The narrower of the two rectangles being that portion of the housing which is inserted through the camera wall 7 and into the light path of the camera. The wider portion of the shutter thus abuts the camera wall and maintains the shutter in position.

The housing sections 4, 5, are provided with cavities 8, 9, in their opposing surfaces; the cavities being substantially equal in length and width to the glass block 2, with each cavity having a depth substantially equal to one half the thickness of the glass block, whereby the housing sections when assembled contain and rigidly position the glass block. The assembled housing 3 is provided with a circular opening 10 having its centerline extending perpendicularly through the center of the cap section 6 to the center point of the near edge of the glass block 2. That part of the circular opening 10 which extends through the cap section 6 is female threaded to accommodate a mating cap screw 11 which extends through the cap section 6 and into the circular opening in the assembled sections 4, 5. The cap screw 11 has a recess in its inner end into which one end of the detonator 1 may be inserted. The diameter and length of the cap screw are thus determined by the length and diameter of the detonator 1, the cap screw being of sufficient diameter to accommodate a portion of the detonator and of sufficient length to maintain the detonator in contact with the edge of the glass block 2. Thus, with the housing 3 assembled and the glass block in place the cap screw 11 and detonator 1 may be inserted through the cap section 6 and turned down until the detonator is held firmly in contact against the edge of the glass block 2.

The housing sections 4, 5, are provided with recesses which act as exhaust ports 13 leading from the detonator 1 to the cap section 6 where the ports 13 are extended to the outer surface of the cap section. Combustion gases formed upon the explosion of the detonator are therefore exhausted through the cap section to the atmosphere. Means for ignition of the detonator are provided through the head of the cap screw 11 by electrical conductors 12 connected to a firing timing circuit not shown.

Through the housing sections 4, 5, is an aperture 14 which allows a light path through the housing 3 and glass block 2. The aperture has a diameter less than the width of the glass block 2 and is positioned along the centerline of the housing. Therefore, all light passing through the aperture must also pass through the optically clear glass. On the inner surface of sections 4 and 5 a recess is provided concentric with the aperture 14 having a diameter substantially larger than the aperture. Circular pieces 15, 16, of transparent non-shattering material such as Lucite, having a thickness less than the depth of the recesses are placed in the recesses and maintained in contact with the glass block 2 by O-rings 17, 18, placed between the circular pieces 15, 16, and the recessed surface of the sections.

The housing sections 4, 5, and cap section 6 are assembled with the glass block in position by a holding means such as stud bolts 19, some of which are shown.

Thus, when assembled, the shutter which is the subject of the present invention comprises a metallic housing having a light aperture therethrough and containing an optically clear, frangible glass block through which the light must also pass. Within the housing, in contact with one edge of the glass block, is a detonator which is positioned and held in contact by a cap screw through which ignition means for the detonator are provided. See Brixner, Journal of the Society of Motion Picture and Television Engineers, volume 59, December 1952, pages 506 and 507. Exhaust ports from the detonator allow the combustion gases to be exhausted through the cap section of the housing.

By way of illustration, a presently preferred embodiment of the present invention has a steel housing with a minimum wall thickness of approximately one-fourth inch. The optically clear, frangible glass block is commercial quality plate glass approximately one-half inch in thickness and one inch by three inches in size. The detonator used to shatter the glass block without damaging the shutter housing is a number 8 standard blasting cap or a detonator containing an explosive charge equivalent to approximately 0.3 gram of pentaerythritol tetranitrate in a brass cartridge one-fourth inch in diameter. The light transmission through the glass block before it is rendered opaque is on the order of ninety per cent, while after shattering its light transmission is approximately 0.01 per cent.

In operation, the shutter is placed in the camera along the light path of the event image in such manner that the shutter forms a light tight obstruction except for the light allowed to pass through the shutter aperture and the optically clear glass block contained therein. With the camera in operation the shutter is actuated at the proper time by a firing timing circuit which ignites the detonator. The shock wave from the detonator is directed into the glass block and as the shock wave moves through the glass it has an internal shattering effect which renders the glass substantially opaque. The glass block after being internally shattered has the appearance of a multitude of minute white particles which effectively reflect and scatter substantially all of the light which attempts to penetrate the shutter aperture. The Lucite pieces located between the glass block and the apertures prevent the possibility of any glass particles breaking away from the surface of the glass block and into the camera through the apertures. The combustion gases are exhausted from the shutter through the exhaust openings of the cap section. Thus, the aperture which is optically clear during the exposure of the photographic film is rendered opaque in less than 3 microseconds after the shock wave from the detonator begins to traverse the aperture.

In the preferred embodiment as shown in the present application the shutter is inserted into a camera through the camera wall in such a manner that the portion of the housing containing the aperture forms an internal part of the camera while the portion of the housing containing the detonator forms a shoulder which abuts the camera wall and remains external to the camera. It may be seen that although the shutter is an integral part of the camera the gases are exhausted to the exterior of the camera and the glass block and detonator may be easily replaced to make the shutter readily reusable.

The shutter described herein may be used in combination with a firing timing circuit of any suitable type such as, for example, that shown on the upper half of page 236 of the Handbook of Industrial Electronic Circuits, first edition, published by McGraw-Hill Book Company.

What is claimed is:

1. A high speed explosively actuated light shutter comprising a metallic housing having light apertures on opposed walls thereof thereby providing a light path therethrough; an optically clear glass plate supported within said housing and firmly positioned in the light path thereof; an explosive detonator supported within said housing in contact with one edge of said glass plate; escape exhaust means for exhausting combustion gases from said housing; and means for detonating said explosive.

2. In combination with a camera for taking photographs of detonating explosives and the like; shutter means comprising an opaque metallic housing and a transparent glass plate supported with said glass plate in the light path of the event image of said camera; an explosive detonator within said housing in contact with one edge of said glass plate; means for maintaining said explosive detonator in contact with the edge of said glass plate; escape exhaust means for permitting combustion gases to escape from said housing; and means for detonating said explosive.

3. In combination with a camera for taking photographs of detonating explosives and the like; a shutter means comprising a metallic housing forming an opaque barrier in the light path of the event image of said camera; a light aperture through said housing; an optically clear frangible plate within said housing and firmly positioned in the light path through said aperture; a transparent retaining means positioned adjacent each lateral surface of said frangible plate; an explosive detonator within said housing in contact with one edge of said frangible plate; means for maintaining said explosive detonator in contact with the edge of said frangible plate; exhaust combustion gas escape means in at least one wall of said housing; and means for igniting said explosive detonator.

References Cited in the file of this patent

UNITED STATES PATENTS 2,470,139   Campbell _____ May 17, 1949